No. 783,682. PATENTED FEB. 28, 1905.
W. COLE.
SAD IRON HANDLE.
APPLICATION FILED OCT. 12, 1903.
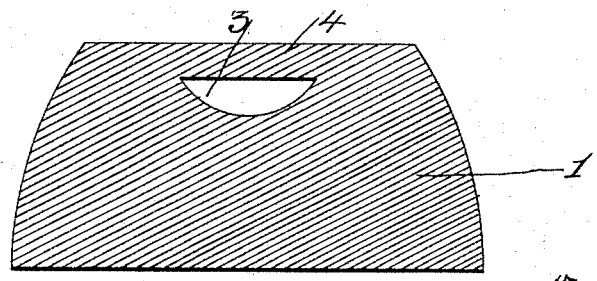
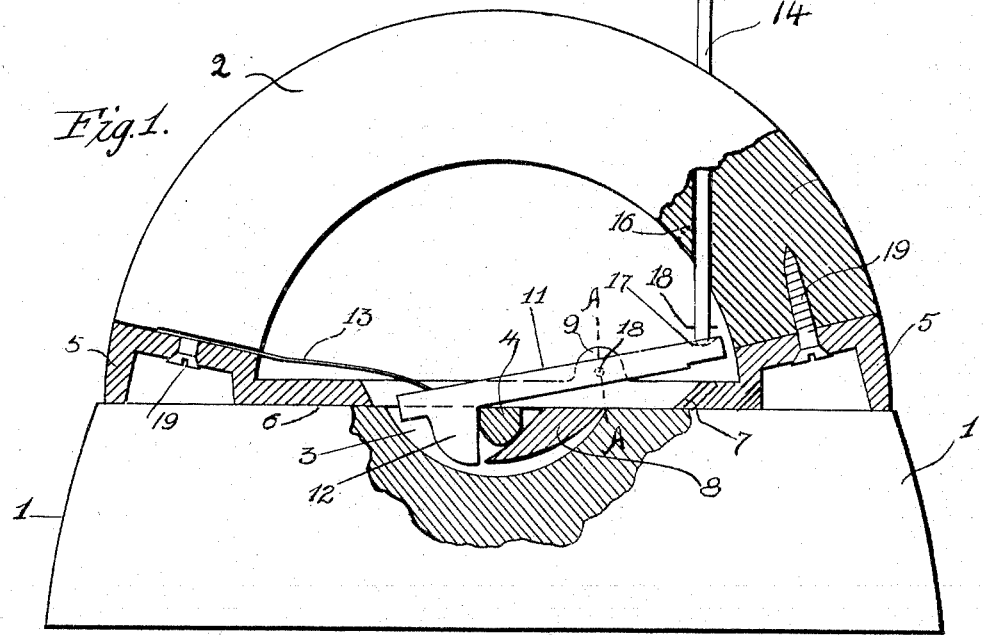
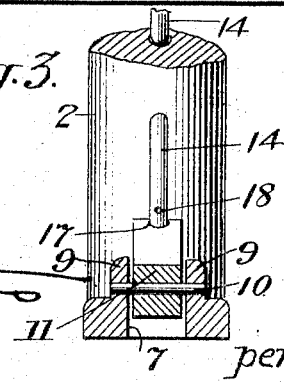
Witnesses.
Geo H Roberts
M. N. Higdon
Inventor:
W. Cole
per
Higdon & Higdon
Attorneys No. 783,682.                                              Patented February 28, 1905.

UNITED STATES PATENT OFFICE.

WILLIAM COLE, OF KANSAS CITY, KANSAS.

SAD-IRON HANDLE.

SPECIFICATION forming part of Letters Patent No. 783,682, dated February 28, 1905.

Application filed October 12, 1903. Serial No. 176,662.

*To all whom it may concern:*

Be it known that I, WILLIAM COLE, a citizen of the United States, residing at Kansas City, in the county of Wyandotte and State of Kansas, have invented new and useful Improvements in Sad-Iron Handles, of which the following is a specification.

My invention relates to sad-iron handles and the means that I employ to secure the handle to the iron while in use.

My invention is illustrated in the accompanying drawings, in which—

Figure 1 represents a side view of a sad-iron in elevation with parts in section. Fig. 2 illustrates a cross-section of Fig. 1, taken centrally across the iron, the handle-plate and the handle being removed, disclosing a cross-bar over a depression formed in the body of the sad-iron. Fig. 3 is a cross-section of the handle-plate, taken on line A A of Fig. 1, disclosing two upwardly-extending ears and the tilting lever in cross-section pivotally mounted between the ears by means of a cross-pin.

With the above illustrations and description I will now proceed to more fully describe my invention by referring to corresponding numerals on the drawings and the specification, in which—

1 designates the body of a sad-iron, and 2 designates the handle of the same. In the top of the sad-iron is a concave depression 3. Horizontally and crosswise of the depression and the iron is a cross-bar 4. A detachable handle-plate 5, which has a level lower face 6, is adapted to smoothly engage the top of the iron 1 and is provided with a longitudinal opening 7. Integral with the under side of said handle-plate is a depending lug 8, which crosses the longitudinal opening 7, as shown in Fig. 1. Said lug is at an angle of about forty-five degrees with the lower face of the handle-plate and is adapted to engage the cross-bar 4, already described, as shown in Fig. 1.

Integral with the handle-plate and extending from the upper side thereof, one on each side of the longitudinal opening 7, is a pair of upwardly-extending ears 9. Said ears are provided with opposite corresponding perforations. Mounted between said ears 9 and pivotally secured thereto is a spring-actuated rocking lever or dog 11. Said lever is provided with a depending lug or catch 12 and is adapted to engage and be disengaged from the cross-bar 4.

Rigidly secured over the rear end of the iron and between the handle-plate and the handle thereof is a spring 13 of sufficient tension to hold the spring-actuated rocking lever, as shown. Near the front portion of the handle is a vertical rod 14, provided with a handle 15. Said rod is mounted on the handle 2, through a vertical opening 16, centrally of the handle, and is adapted to work loosely through said opening, the lower end thereof passing down and engaging the spring-actuated rocking lever 11 in a concave seat 17. I have further provided a cross-pin 18 through the lower end of said vertical rod to prevent disengagement from the handle. The handle is secured to the handle-plate by means of screws 19, as shown.

The operation of attachment and detachment of the handle to the sad-iron is as follows: When the handle is to be attached to the sad-iron, it is grasped by the hand of the user. The thumb is placed on the head 15 of the rod 14 and is forced down, which will raise the depending lug 12 above the lower surface of the handle-plate. Then the lug 8 is inserted under the cross-bar 4, and the thumb is relaxed from the head 15 of the vertical rod 14, when the spring 13 will force the lever 11, with the lug 12, back to the position shown, when the handle is secured to the sad-iron. The detachment of the handle-plate from the sad-iron is produced by a reversal of the above operation.

Having now fully described my invention, what I claim as new, and desire to secure by Letters Patent of the United States, is—

In a handle for sad-irons of the character described, the combination of a plate adapted to engage the top of a sad-iron, an elongated opening in the plate, ears integral with the plate on each side of the opening, a depending lug integral with the plate extending across the opening and adapted to engage a cross-bar in the top of a sad-iron, a tilting lever pivoted to said ears and adapted to engage said cross-bar through the elongated opening, a handle mounted on the handle-plate, a vertical opening in the handle, a vertical rod loosely supported in said opening, the lower end thereof adapted to engage the tilting lever, a cross-pin and a knob carried by the vertical rod, and a resilient spring supported between one end of the handle and the handle-plate, the inner end thereof adapted to engage said tilting lever, substantially as described.

In testimony whereof I affix my signature in the presence of two witnesses.

WILLIAM COLE.

Witnesses:
  GEO. H. ROBERTS,
  M. N. HIGDON.